United States Patent

[11] 3,559,542

[72] Inventor Hubert R. Clapp
  Cresskill, N.J.
[21] Appl. No. 796,134
[22] Filed Feb. 3, 1969
[45] Patented Feb. 2, 1971
[73] Assignee Camera Service Center Inc.
  New York, N.Y.
  a corporation of New York

[54] QUICK RELEASE AND LOCKING MECHANISM FOR A CAMERA LENS MOUNTING
  12 Claims, 8 Drawing Figs.
[52] U.S. Cl. ........................................................... 95/44, 95/11
[51] Int. Cl. ......................................................... G03b 3/00
[50] Field of Search .......................................... 95/44, 42, 11

[56] References Cited
UNITED STATES PATENTS
3,057,278  10/1962  Zill .............................. 95/44

Primary Examiner—John M. Horan
Assistant Examiner—Richard L. Moses
Attorney—Irving Seidman ABSTRACT: This disclosure is directed to a camera construction having a movable or interchange lens mounting provided with a quick lens release and locking mechanism. Essentially the release and locking mechanism includes a pair of coaxially disposed members for receiving the lens mounting which are coupled together for limited axial displacement to effect the locking and unlocking of the lens mounting by effecting limited relative rotation therebetween, with means for prohibiting the rotation of the lens mounting during the actuation of the locking and unlocking movement.

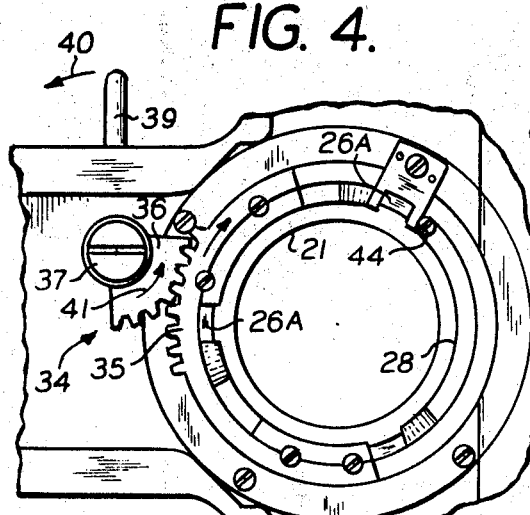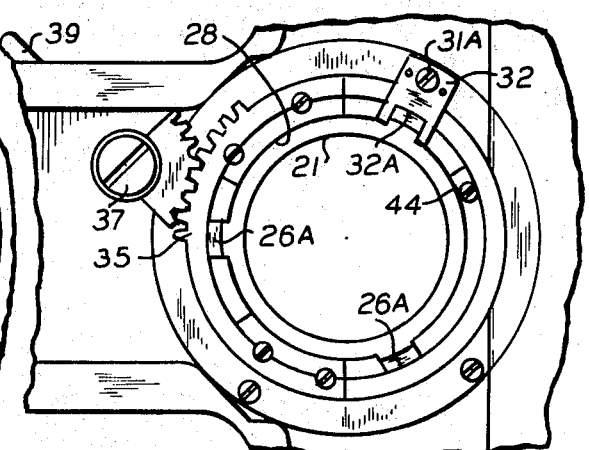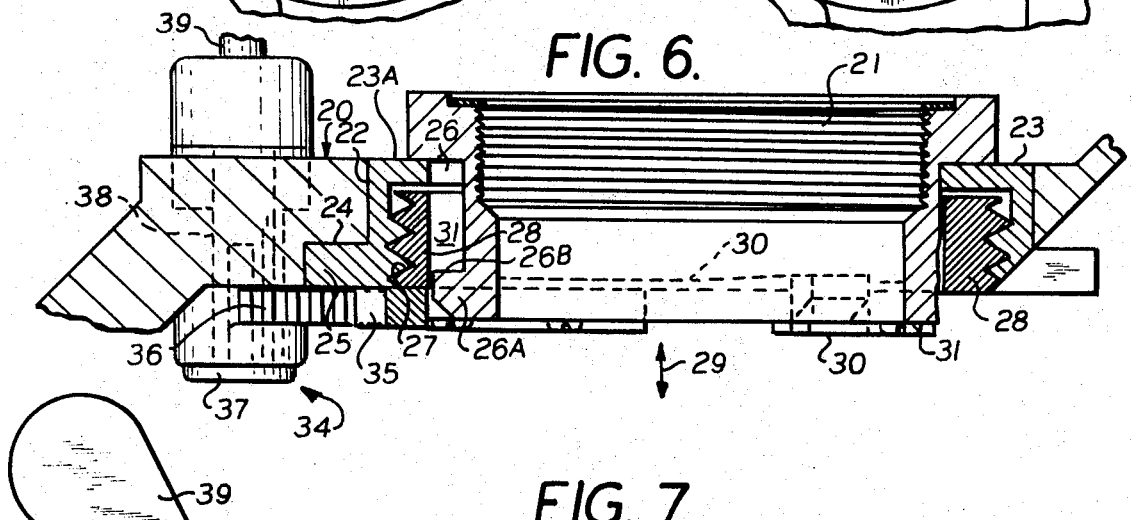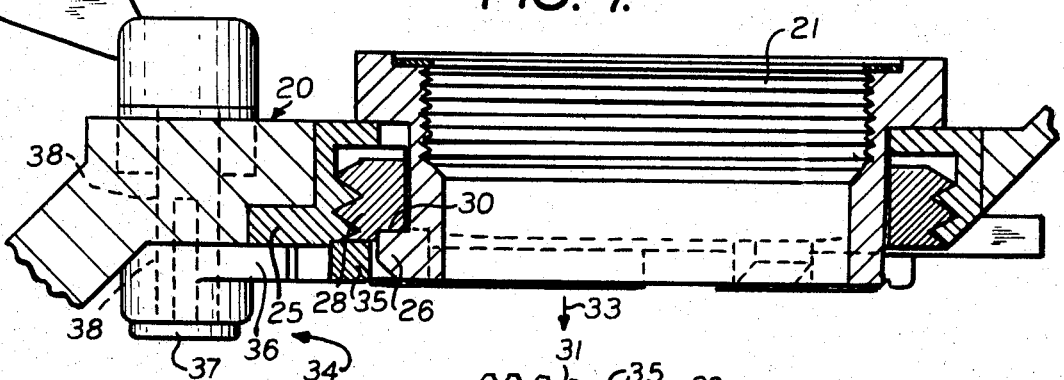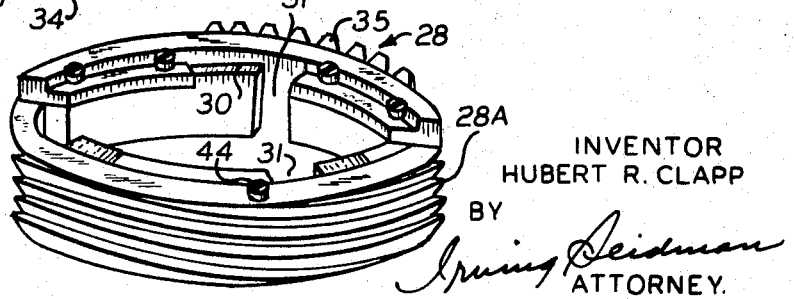

QUICK RELEASE AND LOCKING MECHANISM FOR A CAMERA LENS MOUNTING

PROBLEM IN THE ART

Heretofore, numerous efforts have been made to effect a simple and positive lens release and locking mechanism for cameras having interchangeable or detachable lens construction. Generally the known efforts resulted in relatively complicated and costly structures which tend to increase the overall cost of such camera. Also with the known construction, the release and locking of the lens mounting to the camera body required the rotation of the lens mounting relative to the camera body. With such type locking mechanism it is conceivable that unless the lens mounting was rotated the prescribed exact amount the focus of the camera would be adversely affected.

OBJECTS

It is therefore an object of this invention to provide an improved quick release and locking mechanism for a camera lens mounting in which the locking and unlocking of the lens mounting can be effected without rotating the lens mounting relative to the camera body.

Another object is to provide a quick lens release and locking mechanism in which the lens mounted fitted thereto is positively prohibited from rotating as the mechanism is actuated between locking and unlocking positions.

Another object is to provide an improved quick lens release and locking mechanism which is relatively simple in structure, relatively inexpensive to operate and positive in operation.

BRIEF SUMMARY OF INVENTION

The foregoing objects and other features and advantages of this invention are attained by a lens release and locking mechanism comprising a lens-seating ring fixedly secured to a camera body to define an opening for accommodating the lens mounting. The lens mounting is provided with a plurality of spaced projecting lugs which complement keyway notches formed in the seating ring to effect orientation of the lens mounting in the assembled position. A locking collar is coupled to the seating ring in a manner whereby relative rotation therebetween effects limited axial displacement of one with respect to the other. The locking ring is provided with keyways to complement the keyway notches of the seating ring in the unlocked position. The collar is also provided with an internal shoulder or flange arranged to override the projecting lugs of the lens mounting in the locked position. To prohibit relative rotation of the lens mounting during a locking and unlocking operation a retainer means is fixedly secured relative to the locking collar. The retainer means comprises a lug having a notch disposed in alignment with one of the keyway notches of the seating ring for accommodating a lug of the lens mounting when the lens mounting is in position in the coaxially arranged seating ring and locking collar. With the lens mounting in position the locking collar is rotated relative to the seating ring, and being coupled thereto by a threaded connection, the locking ring is axially displaced. The axial displacement causes the internal shoulder to cam or engage the lugs of the lens mounting to firmly secure the lens mounting to the camera body.

The means for effecting rotation of the locking collar include a gear sector disposed in meshing relation with a gear ring sector secured to the locking collar. A manual actuator on the camera body is operatively connected to the operating gear sector, which when actuated will effect rotation of the locking collar between locking and unlocking position.

FEATURES

A feature of this invention resides in the provision of a positive locking and unlocking mechanism which can be readily actuated in a manner which prohibits rotation of the lens mounting.

Another feature resides in the provision of an improved lens locking mechanism which ensures a quick releasing and locking action with a minimum of effort and lost motion.

Another feature resides in a locking mechanism comprising of a minimum of operating components and which is positive in operation.

Other features and advantages will become more readily apparent when considered in view of the drawings, in which:

FIG. 4 illustrates a bottom plan view similar to that of FIG. 2 with the lens mounting assembled in unlocked position within the camera body;

FIG. 5 is a view similar to FIG. 4 with the lens mounting assembled in locked position within the camera body;

FIG. 6 is a vertical sectional view illustrating the camera body and lens mounting assembled in unlocked position;

FIG. 7 is a vertical sectional view similar to that of FIG. 6 but illustrating the lens mounting assembled in the locked position; and FIG. 8 is a detail perspective view of the locking collar of the present invention.

Figure 1:
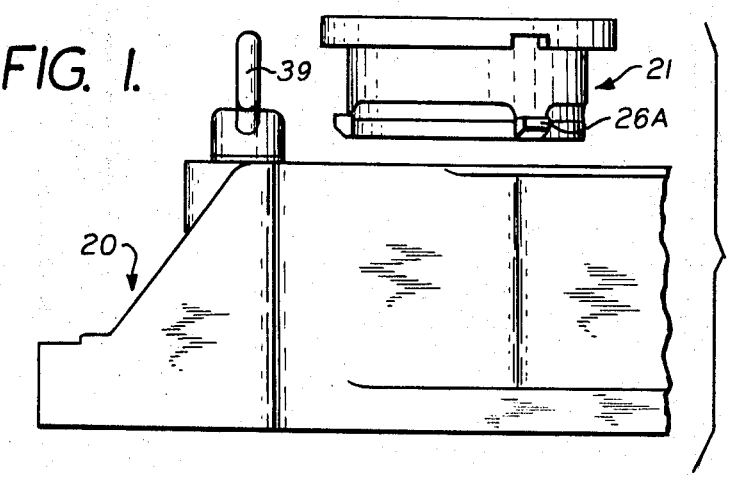
FIG. 1 is a fragmentary side elevation view of a camera body illustrating the lens mounting detached therefrom.
Figure 2:
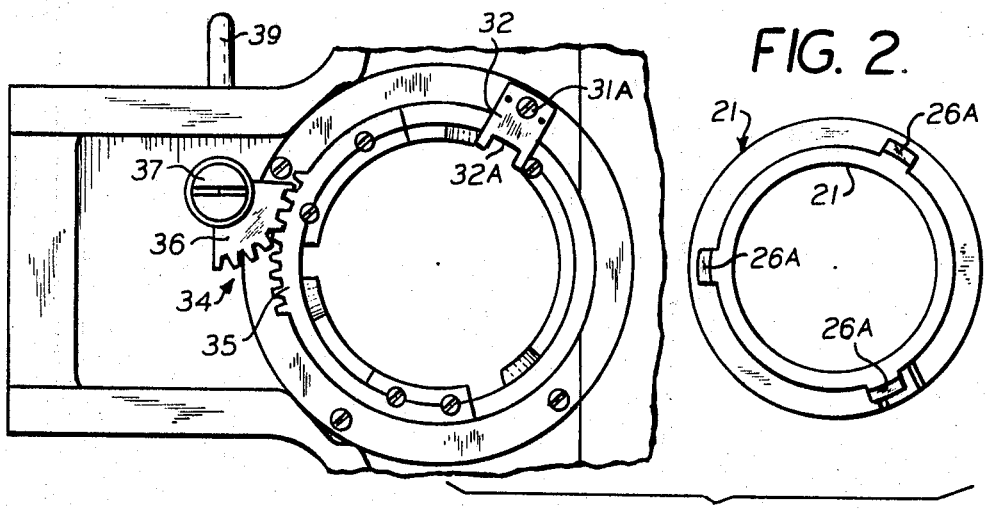
FIG. 2 is a bottom plan view of FIG. 1 with the lens mounting detached therefrom.

Referring to the drawings there is illustrated a camera body 20 of a type adapted to receive a readily detachable and/or interchangeable lens mounting assembly 21. As best seen in FIGS. 6 and 7 the camera body is provided with an opening 22 for receiving a lens seating ring 23. The inner end of opening 22 is counterbored as at 24 for receiving a laterally extending flange 25 of the seating ring 23. Suitable fastening means, as for example pins or screws, (not shown) are provided for fixedly securing the seating ring 23 within the camera opening 22. The outer end of the seating ring 23 is provided with an inturned annular flange 23A, which as illustrated is disposed flush with the planar surface of the camera body 20.

Figure 3:
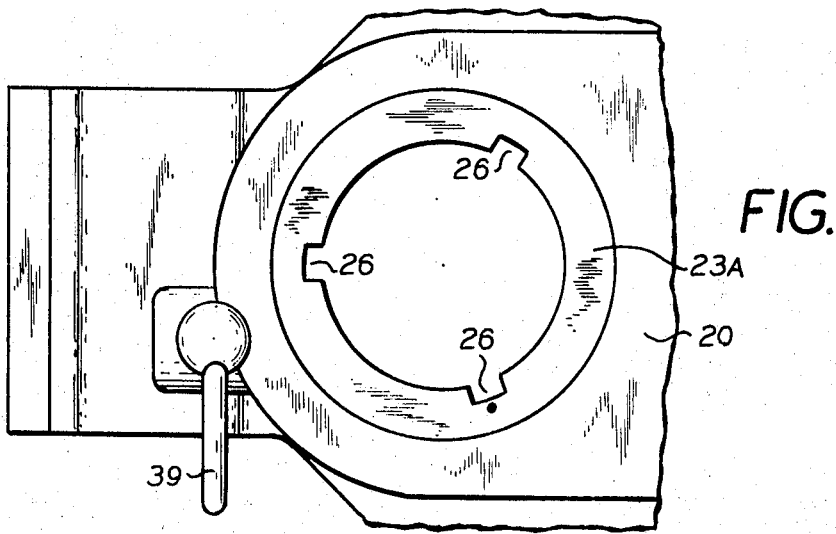
FIG. 3 is a top plan view of the camera body of FIG. 1.

As best seen in FIG. 3 the flange portion 23A of the seating ring 23 is provided with one or more keyway notches 26 circumferentially spaced about the inner peripheral portion of the seating ring flange 23A. In the illustrated form three such keyway notches 26 are illustrated. Preferably the spacing of the key way notches 26 is irregular, that is not equidistantly spaced about the periphery of the defined opening of the seating ring 23. The keyway notches 26 are adapted to receive the locating lugs 26A which project laterally from the inner or lower end of the lens housing 21 as seen in FIG. 1. Accordingly, the lugs 26A are circumferentially spaced about the lens mounting 21 so as to complement the spacing or intervals between keyway openings 26. The irregular complementary relative position of the lugs 26A and the keyway openings 26 adapted to receive them are thus arranged to insure proper orientation of the lens mounting with respect to the seating ring 23. Therefore, the lens mounting 21 can only be inserted through the seating ring 23 when the lugs 26A are disposed in proper alignment with the keyway notches 26.

Referring to FIGS. 6 and 7 the seating ring is also provided with an internal threaded portion 27 which is adapted threadedly engaged with a locking collar 28. The locking collar comprises an annular member, externally threaded at 28A by which it can be readily threaded to the threads 27 of the seating ring 23. The complementary threads 27, 28A of the seating ring 23 and the locking collar 28 are such that upon relative rotation between the locking collar 28 and the seating ring 23, the locking collar will be axially displaced in the direction indicated by arrow 29. The locking collar 28 is provided with an internal shoulder portion 30 adjacent the inner end thereof. Circumferentially spaced about the interior surface of the locking collar are a plurality of keyways 31 which are adapted to be disposed in and out of alignment with the keyway notches 26 of the seating ring. In the unlocked position of the quick release and locking mechanism, the keyway notches 31 of the locking collar are disposed in axial alignment with the keyway notches 26 of the seating ring. In this position it will be noted that with the lens mounting 21 properly oriented, the lugs 26A thereof will be received thereby as the lens mounting 21 is inserted into position within the lens seating ring 23 and associated locking collar 28.

As best viewed in FIG. 2 and FIGS. 4, 5, 6, and 7, a retainer means 32 is fixedly secured with respect to the locking collar 28. The retainer means in the form of a lug or bracket is fastened by a suitable fastening means or screw 31A to the lateral flange 25 of the ring-seating member 23. The inner end of the retainer lug 32 is provided with a notch 32A, disposed in alignment with keyways 26 and 31 and the projecting lugs 26A of the lens mounting means 21 when the latter has been inserted in the camera opening defined by the coaxial aligned seating ring 23 and locking collar 28. With the lug 26A of the lens mounting 21 received within the notch 32A of the retainer means 32, rotation of the lens mounting 21 is prohibited during the locking and unlocking action, hereinafter described.

With the construction described it will be noted that locking of the lens mounting 21 within the seating ring 23 and locking collar 28 is attained by effecting limited angular rotation of the locking collar 28 with respect to the seating ring 23. Accordingly, the locking collar 28 is rotated in the direction necessary to effect axial displacement thereof inwardly of the camera body or in the direction of arrow 33. Upon such rotation, the internal shoulder 30 of the locking collar 28 will override and engage with contacting surface 26B of lug 26A so as to effect the locking of the lens mounting 21 to the camera 20. The axial displacement of the locking collar 28 in the direction of arrow 33 also insures a firm abutment or seating between the lens mounting means 21 and the associated flange 23A of the seating ring 23, as seen in FIG. 7. In this position the lens mounting 21 is securely locked to the camera body and which locking effect is attained without affecting rotation of the lens mounting 21 within the seating ring, as rotation thereof is prohibited by the fixed retainer 32 which engages one of the locating lugs 26A of the lens mounting 21.

To effect the rotation and axial displacement of the locking collar, an actuating means is provided whereby the rotation of the locking collar may be effected from an exterior position of the camera body. In the illustrated embodiment, actuation of the locking collar 28 is attained by a gear ring section 35 suitably secured to a circumferential portion of collar 28. An operating gear sector 36, disposed in meshing relationship with the gear ring section 35 of the locking collar, is pivotally mounted to the camera body about pivot 37, as best seen in FIGS. 4 to 7. An operating shaft 38 extending through the camera body 20 is operatively connected to the pivot 37 of the gear sector 36. Connected to the extended end of the shaft 38 is an operating handle 39, which when actuated will effect the rotation of the gear sector in one direction or the other accordingly.

As viewed in FIG. 4, when the actuating handle 39 is moved to the left as indicated by arrow 40, the associated gear sector 36, operatively connected thereto through shaft 38 is rotated in a counterclockwise direction about pivot 37, as indicated by arrow 41. The gear ring section 35, connected to the locking collar 28 and in meshing relation with sector 36 is rotated in a clockwise direction an amount sufficient for the shoulder portion 30 to override the projected lugs 26A of the lens mounting 21. In doing so the axial displacement of the locking collar 28 in the direction of arrow 33 causes the internal shoulder 30 to effect limited axial displacement of the lens mounting 21 until such lens mounting 21 is firmly seated or disposed in abutting relationship to the flange portion 23A of the seating ring. In the position indicated in FIG. 5 the lens mounting is securely retained with in the opening of the camera body. To unlock the lens-mounting means the operation is reversed.

With the construction described it will be apparent that the locking and unlocking of the lens mounting 21 within the lens opening defined by the complementary seating ring 23 and locking collar 28 is such that with limited angular rotation of the locking collar 28 relative to the seating ring 23, a positive locking and releasing action is afforded. With the locking mechanism described, it will be noted that it can be actuated in a manner whereby rotation of the lens mounting 21 within the seating ring 23 is positively prohibited by one of the locating lugs being disposed and retained in notch 32A of the retainer means 32. By rotating the actuating handle 39 through a small angular degree as seen in FIGS. 4 and 5, the locking and unlocking of the lens mounting is affected accordingly.

To limit rotation of the locking collar and to properly position the keyways 31 in proper alignment with the keyway notches 26 of the seating ring, a stop 44 is provided. Referring to FIGS. 4 and 5, a preferred stop comprises a setscrew or abutment 44 on the collar 28 which will engage the retainer means 32 to limit rotation of the collar when the keyways 31 of the collar are disposed in alignment with keyway notches 26 of the seat ring 23. Thus by effecting rotation of the locking collar 28 in a counterclockwise direction as viewed in FIG. 5 until the stop abutment 44 engages the edge of the retainer 32, the alignment of keyways 31 with keyway notches 32A is assured.

While the instant invention has been described with respect to a particular embodiment thereof, it will be readily appreciated and understood that variations and modifications may be made without departing from the spirit of scope of the invention.

I claim:

1. In combination with a camera body and a detachable lens mounting therefor, the improvement of a quick release and locking mechanism for detachably securing the lens mounting to the camera body comprising:
    a first and second member having coaxially disposed openings for receiving the lens mounting;
    means for coupling said members for limited axial displacement therebetween;
    means for retaining said lens mounting against rotation when disposed in said first and second members; and
    means for effecting axial displacement of one of said members relative to the other whereby said axially displaced member frictionally secures said lens mounting in position therein.

2. The invention as defined in claim 1 and including complementary means formed on said lens mounting and each of said members for orienting the position of said lens mounting within said members.

3. The invention as defined in claim 1 wherein said coupling means comprise 15 complementary threads formed in said members whereby relative rotation therebetween effects limited coaxial displacement therebetween.

4. The invention as defined in claim 1 wherein said lens mounting is provided with at least one projecting lug, and said first and second members being formed with complementary keyways for receiving said lug in the assembled position of said lens mounting, whereby said complementary keyways are disposed in axial alignment in the unlocked position of said members and in misalignment in the locked position of said members.

5. The invention as defined in claim 4 wherein said means for effecting axial displacement of said members comprises:
    a gear ring section connected to one of said members;
    a complementary gear sector pivotally mounted on said camera body;
    said gear sector being in meshing relationship with said gear ring section; and
    an actuator operatively connected to said gear sector to effect limited rotation thereof and of the gear ring sector and its connected member to effect the locking and unlocking of said lens mounting within said members.

6. The invention as defined in claim 1 wherein said first member comprises a lens seat ring fixedly connected to said camera body, and said second member comprises a locking collar coupled to said seat ring for limited axial displacement with respect thereto.

7. The invention as defined in claim 6 wherein:
said seat ring and said locking collar are provided with complementary threaded portion for rotatably coupling said locking collar to said seat ring in coaxial alignment;
said lens mounting having a plurality of projecting lugs connected to the end portion thereof adapted to be received in said lens seat and associated locking collar; and
said lens seat and locking collar having complementary keyways adapted to be disposed in alignment for accommodating said lugs in the unlocked position thereof, and said complementary keyways being disposed out of alignment in the locked position thereof.

8. The invention as defined in claim 7 wherein said retaining means comprises a lug fixed to said lens seat ring, said lug having a retaining notch disposed in alignment with one of the complementary keyways of said lens seat ring for receiving the corresponding lug of said lens mounting.

9. The invention as defined in claim 8 wherein said collar is provided with an internal shoulder portion which when rotated effects a camming action with said lugs to positively secure said lens mounting to said camera body.

10. The invention is defined in claim 9 wherein said means for effecting axial displacement of said members comprises:
a gear ring section connected to the inner end of said collar;
a complementary gear sector pivotally connected to said camera body;
said gear sector being disposed in meshing relationship with said gear ring section;
a pivot shaft connected to said gear sector, said pivot shaft extending through the camera body; and
an actuator connected to the projected end of said shaft to operate said gear sector between locking and unlocking positions.

11 In combination a camera body and a lens mounting adapted to be detachably connected therefrom, the improvement comprising:
means defining a lens seat fixed to said camera body;
means defining a locking collar;
means for coupling said locking collar within said lens defining seat means for effecting limited relative axial movement therebetween;
complementary means on said lens mounting and said lens seat for orienting said lens mounting with respect to said lens seat;
retainer means mounted within said camera body to engage said lens mounting to prohibit rotation thereof within said lens seat; and
means for effecting relative axial displacement between said locking collar and said lens seat for positively locking said lens mounting within said lens seat.

12. In combination:
a camera body having an opening therein:
a lens seat ring fixedly secured to said body within said opening;
said seat ring having an inturned flange adjacent the outer end thereof, and an internal threaded portion;
a removable lens mounting having a plurality of circumferentially spaced lugs projecting outwardly therefrom adjacent the end portion adapted to be received within said seat ring;
said flange having complementary keyway notches formed therein for accommodating the lugs of said lens mounting;
a locking collar having an external threaded portion coupled to the internal threaded portion of said seat ring whereby relative rotation therebetween effect axial displacement of said locking collar relative to said seat ring;
said locking collar having a plurality of complementary keyway notches adapted to complement the keyway notches of said seat ring in the unlocked position of said collar;
a retainer lug fixed to said lens seat ring;
said retainer lug having a notch therein disposed in alignment with one of said keyway notches of said seat ring so as to accommodate the corresponding lug of said lens mounting and to retain said lens mounting from rotating within said locking collar; and
means for effecting relative rotation between said ring seat and lens mounting therein whereby said collar is axially displaced inwardly of said camera with the shoulder portions thereof overriding the lugs of said lens mounting to frictionally secure said lens mounting within said camera.